(12) United States Patent
Kaku (10) Patent No.: US 10,033,453 B2
(45) Date of Patent: Jul. 24, 2018

(54) REPEATER

(71) Applicant: DENSO CORPORATION, Kariya, Aichi-pref. (JP)

(72) Inventor: Yoshifumi Kaku, Kariya (JP)

(73) Assignee: DENSO CORPORATION, Kariya (JP)

( * ) Notice: Subject to any disclaimer, the term of this patent is extended or adjusted under 35 U.S.C. 154(b) by 103 days.

(21) Appl. No.: 15/186,696

(22) Filed: Jun. 20, 2016

(65) Prior Publication Data

US 2017/0012694 A1 Jan. 12, 2017

(30) Foreign Application Priority Data

Jul. 7, 2015 (JP) ................. 2015-136267

(51) Int. Cl.
*H04B 7/14* (2006.01)
*H04L 12/935* (2013.01)
*H04L 12/931* (2013.01)

(52) U.S. Cl.
CPC ............... *H04B 7/14* (2013.01); *H04L 49/30* (2013.01); *H04L 49/35* (2013.01)

(58) Field of Classification Search
CPC ... H04L 12/42; H04L 12/437; H04L 12/4637; H04L 2012/6437; H04L 2001/0097; H04L 49/30; H04L 49/35; H04L 49/351; H04L 49/354; H04B 7/14
See application file for complete search history.

(56) References Cited

U.S. PATENT DOCUMENTS

| 2008/0107027 A1 | 5/2008 | Allan et al. | |
| 2008/0239970 A1* | 10/2008 | Lu | H04L 12/40182 370/245 |
| 2009/0003199 A1* | 1/2009 | Sugawara | H04L 12/4637 370/223 |
| 2010/0002705 A1* | 1/2010 | Takatori | H04L 12/4645 370/395.3 |
| 2012/0008491 A1* | 1/2012 | Shimada | H04L 12/4633 370/218 |

FOREIGN PATENT DOCUMENTS

JP 1986-205045 A 9/1986

* cited by examiner

*Primary Examiner* — Peter Chen
(74) *Attorney, Agent, or Firm* — Posz Law Group, PLC (57) ABSTRACT

A repeater is implemented as switches, each having ring-connection ports. In an address table in each of the switches, a list of hop numbers is stored as additional information in addition to the addresses, listing hop numbers to each of destination devices for the ring-connection ports in association with an address. When a communication controller in each of the switches finds the same destination address stored in the address table for the ring-connection ports, the communication controller selects, from the address table, one of the two destination addresses for the ring-connection ports having a smaller hop number as a transfer destination of the frame, thereby enabling the frame to take a shortest possible communication route to the destination devices.

4 Claims, 6 Drawing Sheets

|     P1     |      | P2         |      | P3         | P4         |
|------------|------|------------|------|------------|------------|
| MAC ADDR.  | HOPS | MAC ADDR.  | HOPS | MAC ADDR.  | MAC ADDR.  |
| AD17       | 1    | AD17       | 3    | AD15       | AD16       |
| AD18       | 1    | AD18       | 3    |            |            |
| AD19       | 2    | AD19       | 2    |            |            |
| AD20       | 2    | AD20       | 2    |            |            |
| AD21       | 3    | AD21       | 1    |            |            |
| AD22       | 3    | AD22       | 1    |            |            |

FIG. 4

|     P1     |      | P2         |      | P3         | P4         |
|------------|------|------------|------|------------|------------|
| MAC ADDR.  | HOPS | MAC ADDR.  | HOPS | MAC ADDR.  | MAC ADDR.  |
| AD15       | 1    | AD15       | 3    | AD17       | AD18       |
| AD16       | 1    | AD16       | 3    |            |            |
| AD19       | 3    | AD19       | 1    |            |            |
| AD20       | 3    | AD20       | 1    |            |            |
| AD21       | 2    | AD21       | 2    |            |            |
| AD22       | 2    | AD22       | 2    |            |            |

REPEATER

CROSS REFERENCE TO RELATED APPLICATION

The present application is based on and claims the benefit of priority of Japanese Patent Application No. 2015-136267, filed on Jul. 7, 2015, the disclosure of which is incorporated herein by reference.

TECHNICAL FIELD

The present disclosure generally relates to a repeater used in a communication network.

BACKGROUND INFORMATION

In an Ethernet (registered trademark) network, a ring shape topology of a plurality of repeaters, i.e., Ethernet switches, or simply switches, are arranged by connecting those repeaters in a ring/circuit shape. In such a ring shape topology of the repeaters, or the switches, two ports of one switch are connected to ports of two other switches, for a ring shape topology/arrangement of the network. Thus, two communication routes are established between the two switches, one communication route along a clockwise direction of the ring shape network and the other communication route along a counter-clockwise direction.

More practically, the following situation clarifies the above description. That is, when one switch has at least four ports, among which two ports are ring ports for a ring connection of the switches, and the other two ports are normal ports that are respectively connected to two devices (e.g., to a device A from a switch 1 and to a device B from a switch 2), one data communication frame transmitted from the device A reaches the device B in either of the two communication routes described above, because (A) the transmitted frame from the device A may come in from one normal port of the switch 1 to go out from one ring port of the switch 1 to take a clockwise route to reach the switch 2 and to go out from one normal port to the device B, or (B) the transmitted frame from the device A may come in from one normal port of the switch 1 to go out from the other ring port of the switch 1 to take a counter-clockwise route to reach the switch 2 and to go out from the same normal port to the device B.

On the other hand, a patent document 1, JP 2010-509825 A, (Patent document 1) discloses an idea of transferring the frame in a predetermined shortest route to the destination, i.e., from one node to the other node.

The situation described in the above is further examined in terms of how a frame transfer from one device to the other is improved when one switch in the ring shape topology receives a frame that is addressed to a device connected to the normal port of the other switch. That is, how to efficiently transfer a data communication frame from one device connected to the normal port of one switch to the other device connected to the normal port of the other switch is discussed in the following. The data communication frame in question may also be designated as a "frame to other-switch-hung device".

Apparently, in the above-described situation, the network traffic increases more than required when, after the reception of the "frame to other-switch-hung device" in one switch, one switch transmits the two frames from the two ring ports onto the ring-shape network, because one of the two frames that are respectively transmitted from the two ring ports may be dispensable.

On the other hand, when the switch is configured to transmit the frame from only one of the two ring ports onto the ring-shape network after the reception of the "frame to other-switch-hung device", the increase of the network traffic may be prevented. However, the communication route to the other-switch-hung device" may not be the shortest one. Note that, in the patent document 1, an idea of shortest route transmission of the frame is disclosed without describing a concrete method for realizing/implementing the idea.

SUMMARY

It is an object of the present disclosure to provide a network switch, or a repeater, used in a ring shape network topology that is capable of transferring a frame in a shortest possible communication route to a destination device.

A repeater in a communication network includes a plurality of repeaters forming a ring shape topology, the ring shape topology realized by a connection of two specific ports among a plurality of ports in each of the plurality of repeaters. The repeater also includes an address table registering a destination address of a connected device that is connected to each of the plurality of ports in each of the plurality of repeaters for a transfer of a frame in the communication network. The repeater further includes a communication controller controlling a transfer of a frame among the plurality of ports, from a receiving port by which the frame is received to a transmitting port from which the frame is transmitted and transmitting the frame from the transmitting port, the transfer of the frame in one repeater performed based on the destination address registered in the address table of the transmitting port that contains the same destination address of the connected device as the destination address in the received frame.

The plurality of repeaters establish the ring shape topology of the communication network by a connection of the two specific ports among the plurality of ports in one repeater respectively connected to one of the two specific ports in two other different repeaters. Also, the address table registers the destination addresses of normal ports in each of the other repeaters in the communication network, the destination addresses of the normal ports representing destination devices connected to the normal ports that are the ports other than the specific ports in the other repeaters. Further, the address table for each of the specific ports has a registration of additional information about a hop number representing a number of repeaters for the transmitted frame to pass through to reach from each of the specific ports to the connected device. Also, the communication controller includes a determiner determining whether the destination address in the frame that is received by the normal port is registered in the address table of the specific port.

Further the communication controller includes, as a section that is operable when a positive determination yields from the determiner, a selector (i) comparing two hop numbers registered as the additional information in the address table in association with a destination address in the frame received by the normal port and (ii) selecting, as a transfer destination of the frame received by the normal port, a specific port for which the destination address with a smaller one of the two hop numbers is registered.

Also, the communication controller includes, as a section that is operable when a positive determination yields from the determiner, a transmitter transmitting the frame received by the normal port from the specific port selected by the selector.

According to the repeater, or the switch, described above, when the frame is transmitted from the normal port to a destination device that is connected to the normal port of the other repeater, the frame is transmitted from one of two specific ports having a smaller hop number to the destination device. Therefore, the transmitted frame takes a shortest possible communication route to the destination device.

The numerals in the parentheses in claims simply point to examples of the components in the embodiments, thereby not limiting the scope of the claims in any manner.

BRIEF DESCRIPTION OF THE DRAWINGS

Objects, features, and advantages of the present disclosure will become more apparent from the following detailed description made with reference to the accompanying drawings, in which.

DETAILED DESCRIPTION

A communication network in an embodiment to which the present disclosure is applied is described below.

<Configuration of an Embodiment>

Figure 1:
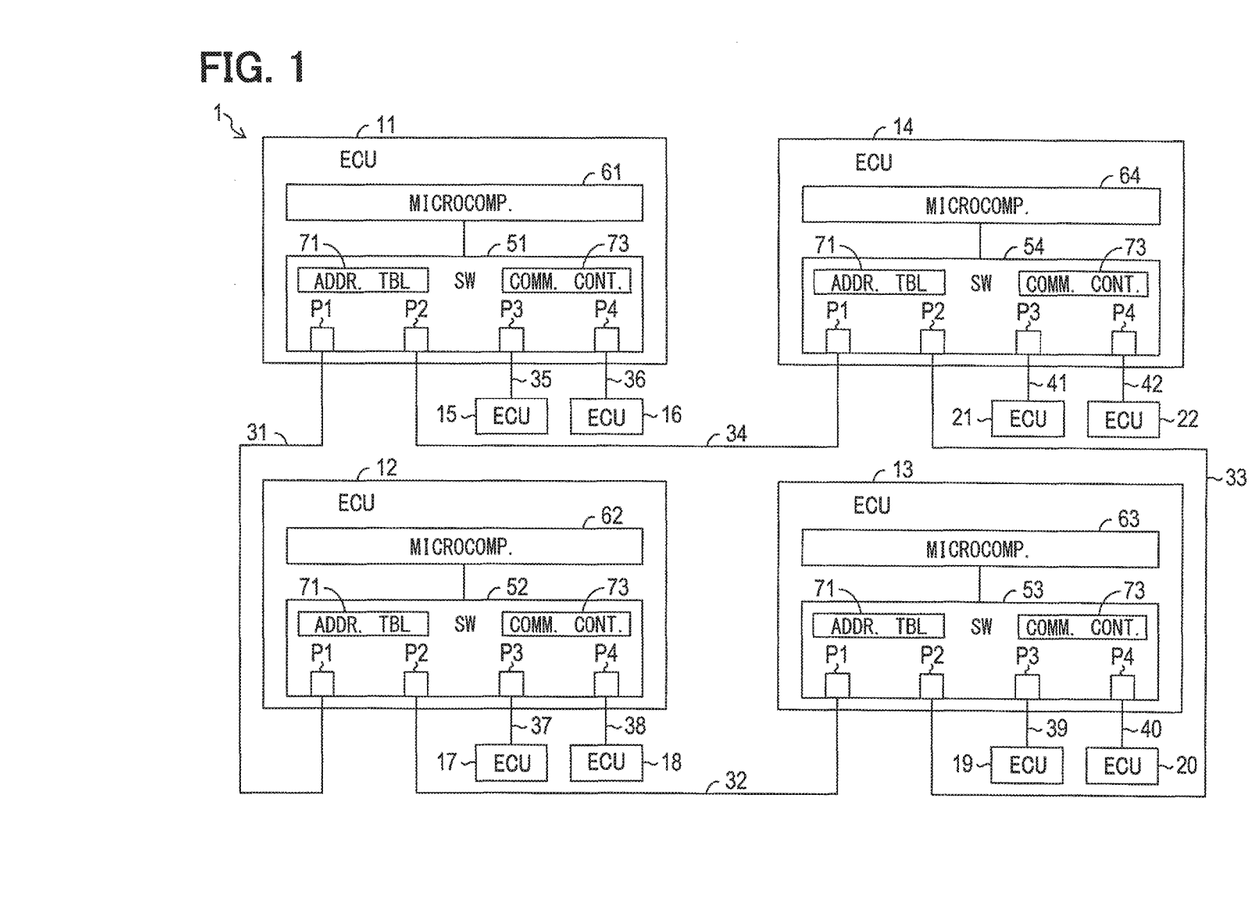
FIG. 1 is a schematic diagram of a configuration of a communication network in an embodiment of the present disclosure.

A communication network 1 of the embodiment shown in FIG. 1 is provided as an Ethernet network, for example in a vehicle, such as a passenger car, to be serving as a communications system in the vehicle.

As shown in FIG. 1, the communication network 1 is provided with ECUs 11-22, which are respectively an electronic control unit, and communication lines 31-42. That is, ECU is an abbreviation of an "Electronic Control Unit."

Each of the ECUs 11-14 is provided with Ethernet switches 51-54 which are the network switches of the Ethernet serving as a repeater of communication between other ECUs 15-22. Further, each of the ECUs 11-14 is provided with one of microcomputers 61-64 as an arithmetic operation unit. Although not illustrated, the microcomputers 61-64 are respectively provided with Central Processing Unit (CPU), Read-Only Memory (ROM), Random Access Memory (RAM), etc.

The switches 51-54 are respectively layer-2 switches (i.e., an L2 switch), for example, and perform communication as a repeater according to the Ethernet standard. Therefore, each of the switches 51-54 is provided with a plurality of ports P1-P4 (e.g., four ports in the present embodiment) for transmitting and receiving a frame, a Media Access Control (MAC) address table 71, and a communication controller 73 that performs the communications process as the repeater according to the Ethernet standard. The MAC address table 71 is memorized by a memory that serves as a storage part for storing data, which is not illustrated. The communication controller 73 may be implemented as a microcomputer, an integrated circuit etc., for example. Note that an operation of each of the switches 51-54 is realized as an operation of the communication controller 73.

In the communication network 1, a port P1 of the switch 51 of the ECU 11 and a port P1 of the switch 52 of the ECU 12 are connected by the communication line 31, and a port P2 of the switch 52 of the ECU 12 and a port P1 of the switch 53 of the ECU 13 are connected to the communication line 32.

Further, a port P2 of the switch 53 of the ECU 13 and a port P2 of the switch 54 of the ECU 14 are connected by the communication line 33, and a port P1 of the switch 54 of the ECU 14 and a port P2 of the switch 51 of the ECU 11 are connected by the communication line 34.

Further, ports P3 and P4 of the switch 51 of the ECU 11 are connected to the ECUs 15 and 16 via the communication lines 35 and 36, respectively, and ports P3 and P4 of the switch 52 of the ECU 12 are connected to the ECUs 17 and 18 are via the communication lines 37 and 38, respectively. Further, ports P3 and P4 of the switch 53 of the ECU 13 are connected to the ECUs 19 and 20 via the communication lines 39 and 40, respectively, and ports P3 and P4 of the switch 54 of the ECU 14 are connected to the ECUs 21 and 22 via the communication lines 41 and 42, respectively.

That is, in other words, each of the switches 51-54 has its ports P1, P2 connected to the ports P1, P2 of other switches 51-54, for establishing a ring topology of the communication network. The ring topology may be re-phrased as a loop shape. The ports P3, P4 not used for establishing the ring topology are connected to the ECUs 15-22 that respectively serve as a communication node.

Therefore, as a communication route between the switches 51 and 54, there are two routes starting from the switch 51, for example. That is, a clockwise route from the switch 51 to the switch 54 and a counter-clockwise route from the switch 51 via the switches 52, 53 to the switch 54 are available. Thus, the two routes described above serve as two, different communication routes for communication between two of the ECU 15-22 that are connected to respectively different switches 51-54.

Note that, in the following description, the ports P1 and P2 among the ports P1-P4 of the switches 51-54 that are used for a ring shape connection may also be designated as a ring port, respectively. The ring ports P1 and P2 respectively correspond to an example of a specific port.

Further, the ports P3 and P4 other than the ring ports, i.e., the port not used for the ring shape connection, may also be designated as a normal port.

Figure 2:
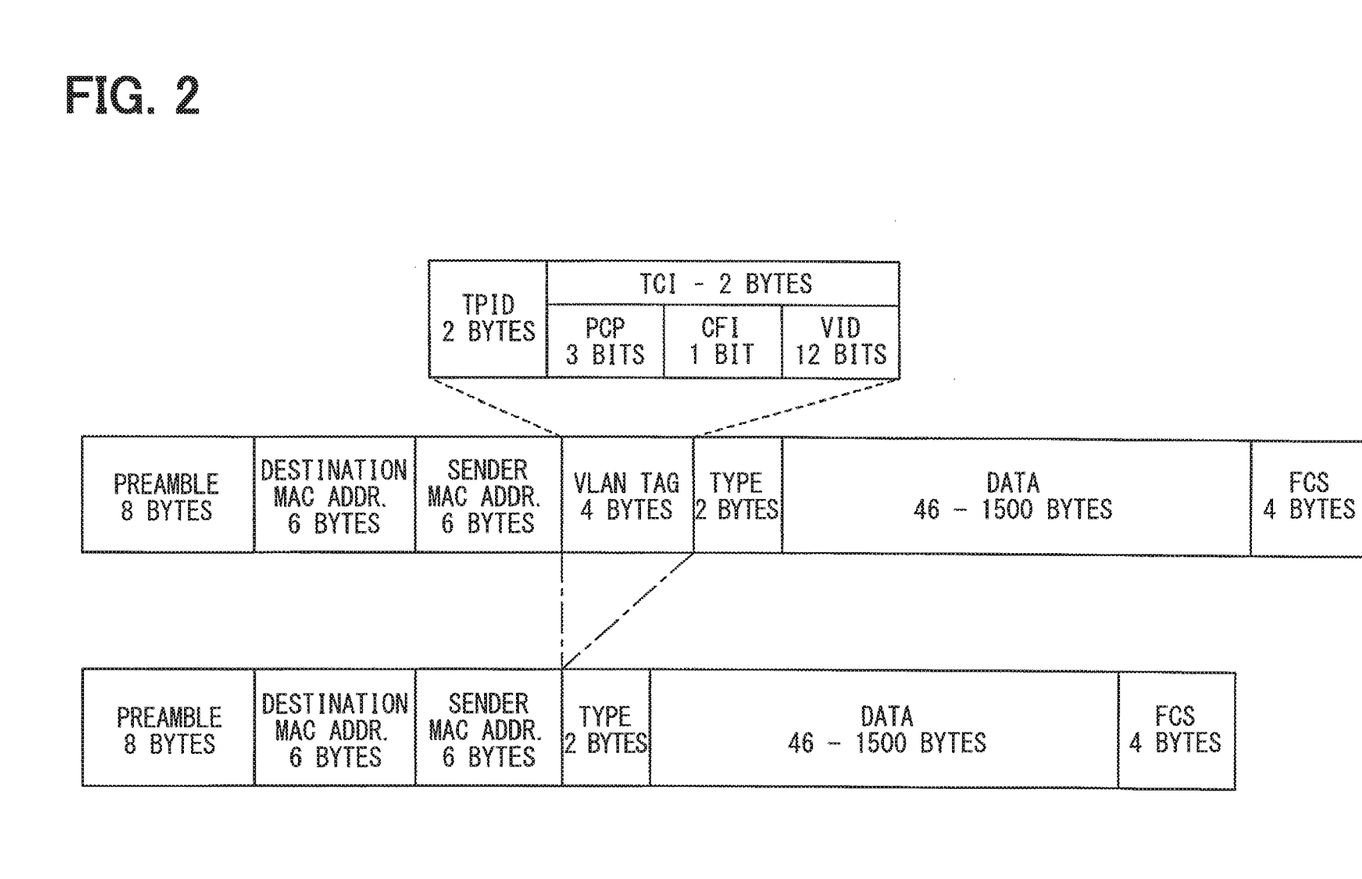
FIG. 2 is a diagram of a configuration of an Ethernet frame.

As a frame exchanged in the communication network 1, there may be two types of Ethernet frames shown in FIG. 2, i.e., a top one and a bottom one, for example.

The Ethernet frame shown as the top one in FIG. 2 has a Virtual Local Area Network (VLAN) tag inserted therein, which may be designated as a VLAN tagged frame in the following.

The Ethernet frame shown as the bottom one in FIG. 2 is a frame without having the VLAN tag inserted therein, which may be designated as a VLAN-tag-less frame in the following.

Each of the frames with or without the VLAN tag is provided with following areas, i.e., a preamble, a destination MAC address, a sender MAC address, a type, data, and an Frame Check Sequence (FCS).

The destination MAC address is a MAC address of a destination device to which the frame is delivered, and corresponds to the "destination address".

The sender MAC address is a MAC address of a frame sending device of the frame, and corresponds to the "sender address".

The MAC address corresponds to an address of the device on the communication network 1.

The frame with the VLAN tag is a frame which has a 4-byte VLAN tag area inserted into the VLAN-tag-less frame. The former half of the VLAN tag area, i.e., the first 2 bytes, serves as a Tag Protocol Identifier (TPID), and the latter half of the ULAN tag area, i.e., the second 2 bytes, serves as a Tag Control Information (TCI).

As the TCI, a Priority Code Point (PCP) of three bits, a Canonical Format Indicator (CFI) of 1 bit, and a VLAN Identifier (VID) of 12 bits are provided.

According to the present embodiment, the TPID, among the VLAN tag areas, may be used as a hop number counter area described later.

On the other hand, in the MAC address table 71 of each of the switches 51-54, the MAC address of the connected device is registered regarding each of the ports, i.e., for each of the four ports in the present embodiment. The MAC address of an ECUn is represented as "ADn" in FIGS. 3 and 4 and in the following description, in which "n" is a suffix of natural numbers.

Figure 3:
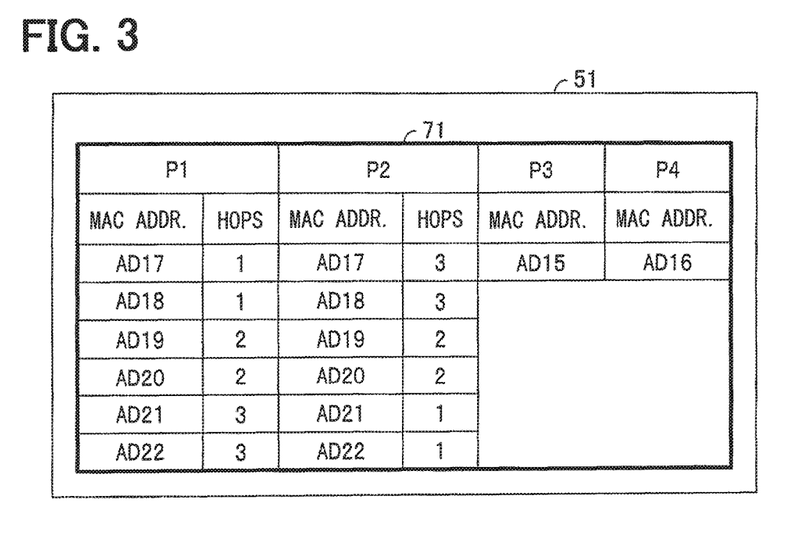
FIG. 3 is a diagram of an example of a MAC address table.

For example, as shown in FIG. 3, in the MAC address table 71 of the switch 51, "AD15" that is the MAC address of the ECU 15 is registered for the normal port P3, and "AD16" that is the MAC address of the ECU 16 is registered for the normal port P4.

Further, for each of the ring ports P1 and of P2, "AD17"-"AD22" that are the MAC addresses of the ECUs 17-22 connected to the normal ports P3 and P4 of the other switches 52-54 are registered in the table 71 of the switch 51. This is because the ECUs 17-22 are connected, via the other switches 52-54, to the ring ports P1 and P2 of the switch 51.

Figure 4:
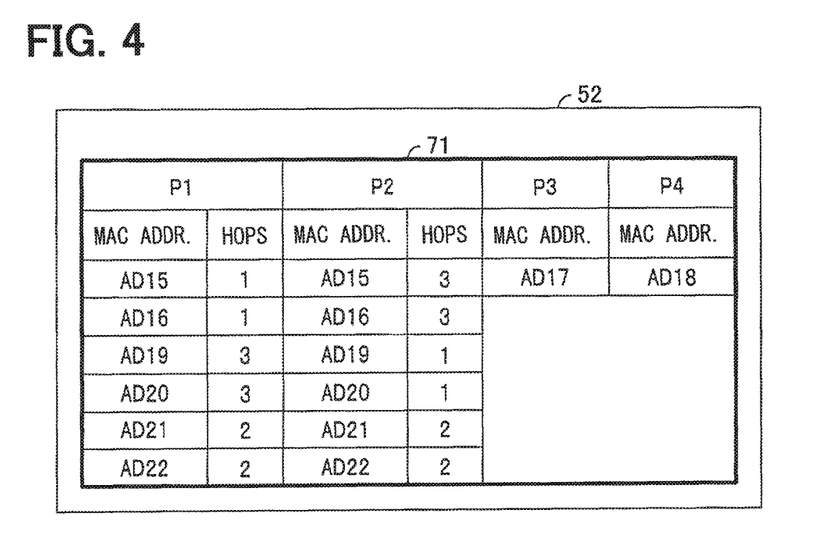
FIG. 4 is a diagram of another example of the MAC address table.

Further, for example, as shown in FIG. 4, in the MAC address table 71 of the switch 52, "AD17" that is the MAC address of the ECU 17 is registered for the normal port P3, and "AD18" that is the MAC address of the ECU 18 is registered for the normal port P4.

Further, for each of the ring ports P1 and P2, "AD15", "AD16", and "AD19"-"AD22" that are the MAC addresses of the ECUs 15, 16, 19-22 connected to the normal ports P3 and P4 of the other switches 51, 53, and 54 are registered in the table 71.

Furthermore, in the MAC address table 71 of each of the switches 51-54, the hop number is also registered as the additional information associated with the MAC address for each of the ring ports P1 and P2.

The hop number is the registered information about how many "hops", i.e., the other devices, a frame transmitted from a ring port of a switch must pass through to reach a destination ECU. The destination ECU in such case means the ECU that has the registered MAC address associated with the hop number concerned in the table 71.

For example, as shown in FIG. 3, in the MAC address table 71 of the switch 51, for "AD17" and "AD18" that are registered for the ring port P1, "1" is registered as a hop number in association therewith. This is because there is one switch 52 existing in the communication route from the ring port P1 of the switch 51 to the ECU 17 or to the ECU 18 among the switches 51-54 connected in a ring shape.

On the other hand, for "AD17" and "AD18" that are registered for the ring port P2, "3" is registered as a hop number. This is because there are three switches 52-54 existing in the communication route from the ring port P2 of the switch 51 to the ECU 17 or to the ECU 18 among the switches 51-54 connected in a ring shape.

In the MAC address table 71 of the switch 51, "3" is registered as a hop number to "AD21" and "AD22" that are registered for the ring port P1. This is because there are three switches 52-54 existing in the communication route from the ring port P1 of the switch 51 to the ECU 21 or to the ECU 22.

On the other hand, for "AD21" and "AD22" that are registered for the ring port P2, "1" is registered as a hop number. This is because there is one switch 54 existing in the communication route from the ring port P2 of the switch 51 to the ECU 21 or to the ECU 22.

In the MAC address table 71 of the switch 51, "2" is registered as a hop number to "AD19" and "AD20" that are registered for the ring port P1. This is because there are two switches 52 and 53 existing in the communication route from the ring port P1 of the switch 51 to the ECU 19 or to the ECU 20.

Also, "2" is registered as a hop number to "AD19" and "AD20" that are registered for the ring port P2. This is because there are two switches 53 and 54 existing in the communication route from the ring port P2 of the switch 51 to the ECU 19 or to the ECU 20.

<The Function and the Process of the Switch>

<<Frame Transfer Function>>

The communication controller 73 in each of the switches 51-54 has the following frame transfer function.

The communication controller 73 determines, upon receiving a frame by one of the ports P1 to P4, a transfer destination port of the received frame, based on the destination MAC address in the received frame and the MAC address table 71.

Specifically, the communication controller 73 determines whether the same MAC address as the destination MAC address in the received frame is registered in the MAC address table 71 for any one of the ports P1-P4 other than the port by which the received frame is received.

Then, if the same MAC address as the destination MAC address in the received frame is registered (i.e., found) in the MAC address table 71, the port in the table 71 having the same MAC address is determined as a transfer destination port.

The communication controller 73 determines all the ports other than the port by which the received frame is received as a transfer destination port, when the same MAC address as the destination MAC address in the received frame is not registered in the MAC address table 71.

Then, the communication controller 73 transmits the received frame from the port that is determined as the transfer destination port.

The frame transfer operation at the time when the same MAC address as the destination MAC address is registered in the MAC address table 71 is designated as "filtering", and the frame transfer operation when the same MAC address is not registered is designated as "flooding".

Further, when the received frame received by one of the ports P1-P4 of a switch concerned is a broadcast frame (i.e., a frame broadcasted from one switch), the communication controller 73 transfers the received broadcast frame with flooding. This is because the broadcast frame uses a broadcast address as a destination MAC address for showing that the broadcast frame itself is a broadcast frame and such a broadcast address is not registered in the MAC address table 71.

Therefore, the communication controller 73 transmits the received broadcast frame from all the ports other than the port by which the received frame is received among the ports P1-P4.

<<MAC Address Table Generation Function>>

The communication controller 73 in each of the switches 51-54 registers, upon receiving a frame by either one of the ports P1-P4, the number of the port by which the received frame is received and the sender MAC address in the received frame in an associated manner in the MAC address table 71. This function is known, in general, as a MAC address learning function.

Therefore, in each of the switches 51-54, if the frame is received by either of the port P3 or the port P4, the sender MAC address in that frame is registered in the MAC address table 71 for the port by which the received frame is received.

For example, when the ECU 15 connected to the normal port P3 of the switch 51 transmits a frame, as shown in FIG. 3, the MAC address (i.e., AD15) of the ECU 15 is registered in the MAC address table 71 of the switch 51 for the port P3.

Further, in the communication network 1, the ECUs 15-22 transmit a broadcast frame at least once, after starting an operation.

For example, an Address Resolution Protocol (ARP) request frame may be transmitted as a broadcast frame. The ECUs 15-22 transmit, for example, the ARP request frame immediately after starting the operation.

Figure 5:
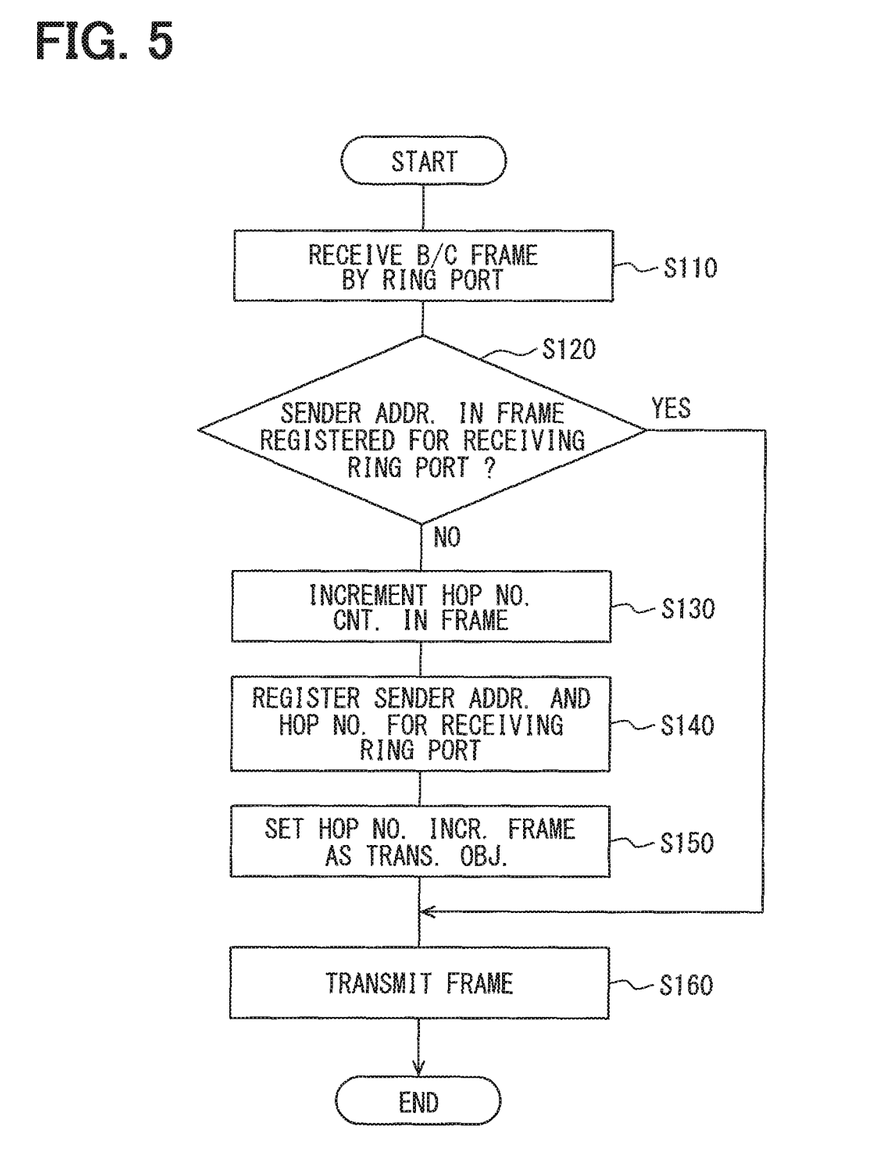
FIG. 5 is a flowchart of a registration process performed by a communication controller of a switch.

Then, the communication controller 73 in each of the switches 51-54 performs a registration process shown in FIG. 5 as a process for registering the MAC address and the hop number in the MAC address table 71 for each of the ring ports P1 and P2.

As shown in FIG. 5, at 8110, when the broadcast frame is received by one of the ring ports P1 and P2 of the switch concerned, the process performed by the communication controller 73 proceeds to S120.

In S120, it is determined by the communication controller 73 whether an address same as the sender MAC address in the received broadcast frame is registered in the address table 71 of the switch concerned for the receiving ring port. The receiving ring port is a ring port by which the broadcast frame is received, and it corresponds to a receiving specific port.

When a negative determination is performed i.e., "NO", in S120 (i.e., when the same MAC address as the sender MAC address in the received broadcast frame is not registered for the receiving ring port), the communication controller 73 advances the process to S130.

Then, in S130, the communication controller 73 increments the hop number counter contained in the received broadcast frame.

The hop number counter is a counter for counting the hop number, or the number of hop devices to the destination address.

Here, the hop number counter is described.

In the present embodiment, the broadcast frame transmitted between the switches 51-54 is a frame with the VLAN tag. From among the VLAN tag areas in the broadcast frame, the TPID area is used, for example, as an area for the hop number counter (i.e., as a hop number counter area). In other words, the data in the TPID area is used as a hop number counter. The hop number counter area may not only be the TPID area but may also be the other areas, e.g., an entire VLAN tag as well as i) TCI and ii) VID or the like in TCI.

Further, in the present embodiment, the broadcast frame transmitted from the ECUs 15-22 is a VLAN-tag-less frame. Then, the switch that has received the broadcast frame firstly from the ECUs 15-22 among the switches 51-54 inserts the VLAN tag area in the received broadcast frame, and the broadcast frame with the ULAN tag is transmitted by the above-mentioned flooding.

That is, in the present embodiment, insertion of the hop number counter area into a frame is performed as an insertion of the VLAN tag area into a frame.

Further, a data value of at least the hop number counter area (i.e., a value of the hop number counter) is set to 0 as an initial value, among the VLAN tag areas that are inserted into the broadcast frame by one of the ECUs 15-22 which has firstly received the broadcast frame.

After the communication controller 73 increments the hop number counter in the broadcast frame in the above-described step S130, the process proceeds to S140.

Then, in S140, the communication controller 73 registers the sender MAC address in the received broadcast frame as a MAC address for the receiving ring port in the MAC address table 71 of the switch concerned.

Further, the communication controller 73 registers a value of the hop number counter after an increment in S130 as a hop number for the sender MAC address that has already been registered.

In S150, the communication controller 73 sets up the broadcast frame after incrementing the hop number counter in S130 as a transmission object by the frame transfer function of the communication controller 73. Then, the communication controller 73 performs frame transmission by the frame transfer function in the following S160.

Therefore, the communication controller 73 transmits, with flooding, the broadcast frame after incrementing the hop number counter, when the process proceeds from S150 to S160. Therefore, the broadcast frame after the increment of the hop number counter is transmitted from all the ports other than the receiving ring port among the ports P1-P4 of the switch concerned.

When an affirmative determination is performed, i.e., "YES", in S120 (i.e., when the same MAC address as the sender MAC address in the received broadcast frame is registered for the receiving ring port), the communication controller 73 advances the process to S160 without performing any other steps. In such case, the communication controller 73 transmits the received broadcast frame with flooding without any change.

Next, an example of the effect regarding the registration process shown in FIG. 5 is described.

Assuming that the ECU 17 has transmitted a broadcast frame when the MAC address of the ECU 17 is not yet registered in the MAC address table 71 in each of the switches 51-54.

The broadcast frame from the ECU 17 is inputted to, i.e., is received by, the normal port P3 of the switch 52. Therefore, the communication controller 73 of the switch 52 registers the MAC address (i.e., AD17) of the ECU 17 in the MAC address table 71 of the switch 52 for the port P3 by the MAC address learning function.

Then, the communication controller 73 of the switch 52 inserts the VLAN tag area into the broadcast frame from the ECU 17, and transmits the VLAN tagged broadcast frame from the ports P1, P2 and P4 of the switch 52. An operation for inserting the VLAN tag into the broadcast frame and for transmitting the VLAN tagged frame is realized as a process of S290 in FIG. 6 described below.

In the switch 51, the broadcast frame transmitted from the ring port P1 of the switch 52 is received by the ring port P1 of the switch 51. Then, the communication controller 73 of the switch 51 performs the process of S130-S160 in FIG. 5.

Therefore, in the switch 51, the hop number counter is incremented from "0" to "1" in the broadcast frame received by the ring port P1. Then, as shown in FIG. 3, the MAC address (i.e., AD17) of the ECU 17 is registered in the MAC address table 71 of the switch 51 as a MAC address for the ring port P1. Further, in the MAC address table 71 of the switch 51, as a hop number to the registered "AD17", the value of "1" after the increment is registered for the ring port P1. Then, from the ports P2-P4 of the switch 51, the broadcast frame having a value of "1" as the hop number counter is transmitted.

In the switch 54, the broadcast frame transmitted from the ring port P2 of the switch 51 is received by the ring port P1 of the switch 54. Then, the communication controller 73 of the switch 54 also performs the process of FIG. 5 of S130-S160.

Therefore, in the switch 54, the hop number counter is incremented from "1" to "2" in the broadcast frame received by the ring port P1. Then, the MAC address (i.e., AD17) of the ECU 17 is registered in the MAC address table 71 of the switch 54 as a MAC address for the ring port P1. Further, in the MAC address table 71 of the switch 54, as a hop number to the registered "AD17", the value of "2" after the increment is registered for the ring port P1. Then, from the ports P2-P4 of the switch 54, the broadcast frame having the hop number counter being set to "2" is transmitted.

In the switch 53, the broadcast frame transmitted from the ring port P2 of the switch 54 is received by the ring port P2 of the switch 53. Then, the communication controller 73 of the switch 53 also performs the process of FIG. 5 of S130-S160.

Therefore, in the switch 53, the hop number counter is incremented from "2" to "3" in the broadcast frame received by the ring port P2. Then, the MAC address (i.e., AD17) of the ECU 17 is registered in the MAC address table 71 of the switch 53 as a MAC address for the ring port P2. Further, in the MAC address table 71 of the switch 53, as a hop number to the registered "AD17", the value of "3" after the increment is registered for the ring port P2. Then, from the port P1, P3 and P4 of the switches 53, the broadcast frame having the hop number counter being set to "3" is transmitted.

On the other hand, in the switch 53, the broadcast frame transmitted from the ring port P2 of the switch 52 is received by the ring port P1 of the switch 53. Then, the communication controller 73 of the switch 53 performs the process of FIG. 5 of S130-S160.

Therefore, in the switch 53, the hop number counter is incremented from "0" to "1" in the broadcast frame received by the ring port P1. Then, the MAC address (i.e., AD17) of the ECU 17 is registered in the MAC address table 71 of the switch 53 as a MAC address for the ring port P1. Further, in the MAC address table 71 of the switch 53, as a hop number to the registered "AD17", the value of "1" after the increment is registered for the ring port P1. Then, from the ports P2-P4 of the switch 53, the broadcast frame having the value of the hop number counter being set to "1" is transmitted.

In the switch 54, the broadcast frame transmitted from the ring port P2 of the switch 53 is received by the ring port P2 of the switch 54. Then, the communication controller 73 of the switch 54 performs the process of FIG. 5 of S130-S160.

Therefore, in the switch 54, the hop number counter is incremented from "1" to "2" in the broadcast frame received by the ring port P2. Then, the MAC address (i.e., AD17) of the ECU 17 is registered in the MAC address table 71 of the switch 54 as a MAC address for the ring port P2. Further, in the MAC address table 71 of the switch 54, as a hop number to the registered "AD17", the value of "2" after the increment is registered for the ring port P2. Then, from the ports P1, P3, and P4 of the switch 54, the broadcast frame having the value of the hop number counter being set to "2" is transmitted.

In the switch 51, the broadcast frame transmitted from the ring port P1 of the switch 54 is received by the ring port P2 of the switch 51. Then, the communication controller 73 of the switch 51 performs the process of FIG. 5 of S130-S160.

Therefore, in the switch 51, the hop number counter is incremented from "2" to "3" in the broadcast frame received by the ring port P2. Then, as shown in FIG. 3, the MAC address (i.e., AD17) of the ECU 17 is registered in the MAC address table 71 of the switch 51 as a MAC address for the ring port P2. Further, in the MAC address table 71 of the switch 51, as a hop number to the registered "AD17", the value of "3" after the increment is registered for the ring port P2. Then, from the port P1, P3, and P4 of the switch 51, the broadcast frame having the value of the hop number counter being set to "3" is transmitted.

Note that, in the switch 52, the broadcast frame, after one round of the communication network 1 in a counter-clockwise direction, which is transmitted from the ring port P2 of the switch 52, is received by the ring port P1 of the switch 52. Further, in the switch 52, the broadcast frame, after one round of the communication network 1 in a clockwise direction, which is transmitted from the ring port P1 of the switch 52, is received by the ring port P2 of the switch 52.

In such case, the communication controller 73 of the switch 52 detects that the subject broadcast frame has already gone one round, and discards the broadcast frames respectively received by the ring ports P1 and P2 in the above situation. That is, for example, the sender MAC address (AD17) in the broadcast frame received by each of the ring ports P1 and P2 of the switch 52 in such case is already registered for the normal port P3 in the MAC address table 71 of the switch 52.

Therefore, the communication controller 73 can detect an after-one-round broadcast frame when the sender MAC address in the broadcast frame received by one of the ring ports P1 and P2 of the switch concerned is already registered for either of the port P3 or P4 in the MAC address table 71.

In the communication network 1, since the communication controller 73 in each of the switches 51-54 is configured to perform the above-mentioned operation, the MAC address table 71 in each of the switches 51-54 is completed (i.e., is completely generated) if all the ECUs 15-22 transmit the broadcast frame.

<<Shortest Route Port Selection Process>>

Figure 6:
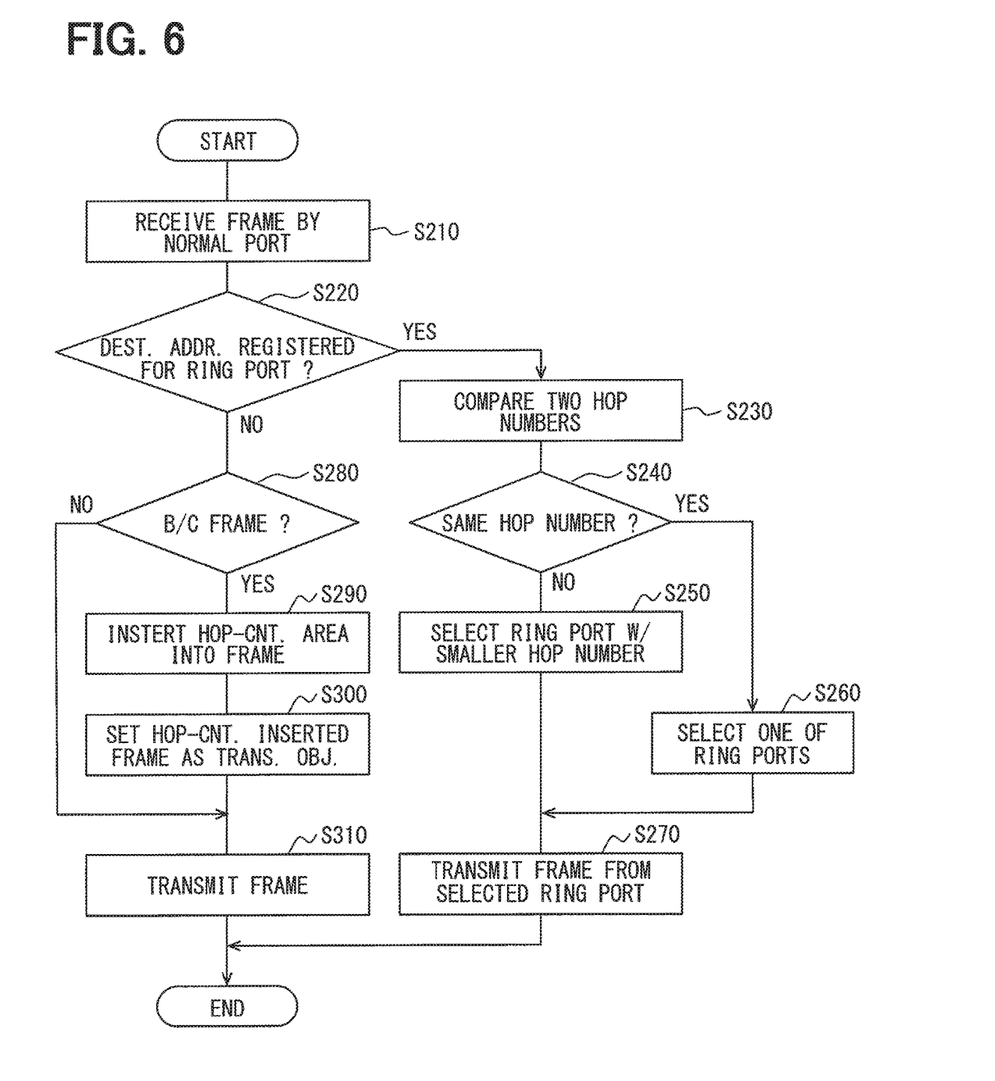
FIG. 6 is a flowchart of a shortest route port selection process performed by the communication controller of the switch.

The communication controller 73 in each of the switches 51-54 performs a shortest route port selection process shown in FIG. 6.

As shown in FIG. 6, in S210, when a frame is received by either of the normal port P3 or P4 of the switch concerned, the communication controller 73 advances the process to S220.

In S220, the communication controller 73 determines whether the same MAC address as the destination MAC address in the frame received by either of the normal port P3 or P4 is registered for the ring ports P1 and P2 in the MAC address table 71 of the switch. Note that, in the following description, a frame received by either one of the normal port P3 or P4 is designated as a normal-port-received frame.

When an affirmative determination is performed, i.e., "YES", in S220 (i.e., when the normal-port-received frame is a frame that has the destination MAC address of an ECU connected to the normal port P3 or P4 of the other switch), the communication controller 73 advances the process to S230.

In S230, the communication controller 73 compares the two hop numbers registered in the MAC address table 71 of the switch concerned, i.e., the two hop numbers in the table 71 registered in association with the same address as the destination MAC address in the normal-port-received frame in the MAC address table 71 of the switch. That is, when the destination MAC address in the normal-port-received frame is designated as "Am", (i) a hop number associated with Am that is registered for the ring port P1 in the MAC address table 71, and (ii) a hop number associated with Am that is registered for the ring port P2, are compared with each other.

Then, in S240, it is determined by the communication controller 73 whether the two hop numbers compared in S230 are the same numbers. When the two hop numbers are not the same, the process proceeds to S250.

In S250, the communication controller 73 selects a ring port associated with a smaller one of the registered hop number among the ports P1, P2 in the switch concerned as a transfer destination of the normal-port-received frame. Then, the communication controller 73 advances the process to S270 after such selection.

When, in S240, it is determined that the two hop numbers compared in S230 are the same, the process proceeds to S260, and the communication controller 73 selects one of the two ring ports P1 and P2 of the switch concerned as a transfer destination of the normal-port-received frame. That is, for example, the communication controller 73 selects, as a transfer destination, one of the two ports P1, P2 based on the frame transmission frequency (i.e., in other words, based on a smaller bus occupancy rate). Further, for example, one of the ports P1, P2 may be selected based on a pre-selection among the two. Then, the communication controller 73 advances the process to S270 after such selection.

In S270, the communication controller 73 transmits the normal-port-received frame from the ring port selected as a transfer destination in S250 or S260.

On the other hand, when a negative determination is performed, i.e., "NO", in S220, the process proceeds to S280, and the communication controller 73 determines whether the normal-port-received frame is a broadcast frame.

When the normal-port-received frame is a broadcast frame, the broadcast frame is a VLAN-tag-less frame that is transmitted by one of the ECUs 15-22. Further, an affirmative determination, i.e., "YES", in S280 is made by, among the switches 51-54, a switch that has firstly received the broadcast frame from either one of the ECUs 15-22.

Therefore, the communication controller 73 inserts a VLAN tag area into the normal-port-received frame in S290 in such case. As mentioned above, in the present embodiment, insertion of the VLAN tag area into a frame corresponds to insertion of the hop number counter area. Further, the data value of at least the hop number counter area (i.e., a value of the hop number counter), among the VLAN tag areas, is set to 0.

Then, in S300 subsequent to S290, the communication controller 73 sets the broadcast frame that has the VLAN tag area inserted therein (i.e., a VLAN tagged broadcast frame) as a transmission object by the frame transfer function of the communication controller 73. Then, in S310, the communication controller 73 transmits a frame by the frame transfer function.

Therefore, the communication controller 73 transmits, with flooding, the VLAN tagged broadcast frame, when the process proceeds from S300 to S310.

Further, when it is determined, in S280, that the normal-port-received frame is not a broadcast frame, the communication controller 73 advances the process to S310 without performing any step.

<<Area Removal Process>>

Figure 7:
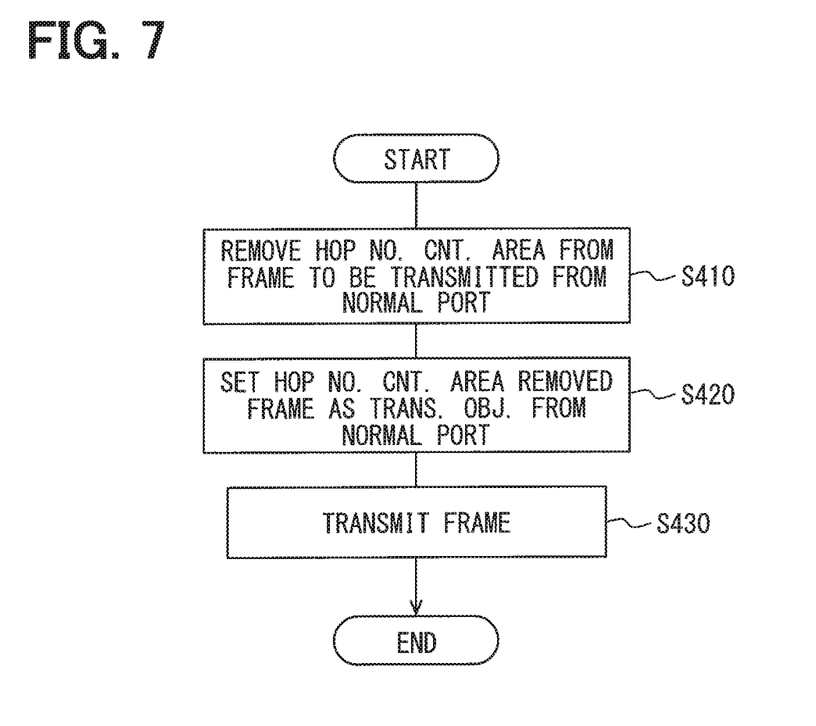
FIG. 7 is a flowchart of a hop counter area removal process performed by the communication controller of the switch.

The communication controller 73 in each of the switches 51-54 performs an area removal process shown in FIG. 7, when transmitting a broadcast frame from the normal ports P3, P4 of the switch concerned.

As shown in FIG. 7, in S410, the communication controller 73 removes a VLAN tag area from the broadcast frame, i.e., from the transmission object that is to be transmitted from the normal ports P3, P4. In the present embodiment, removal of the VLAN tag area from a frame corresponds to a removal of the hop number counter area.

Then, in S420, the communication controller 73 sets the broadcast frame after a removal of the VLAN tag area as a transmission object from the normal ports P3, P4.

Then, in S430, the communication controller 73 performs frame transmission by the frame transfer function. Therefore, the broadcast frame without the VLAN tag (i.e., a VLAN-tag-less broadcast frame) is transmitted from the normal ports P3, P4 in each of the switches 51-54 to one of the ECUs 15-22.

<Example of Operation Regarding the Present Embodiment>

Next, an example operation of a process in S220~S270 of FIG. 6 is described in a concrete manner.

Assuming that, in such an example operation, frames f15-f17 are transmitted from the ECU 15, to a destination of the ECU 17. In such case, "AD17" that is a MAC address of the ECU 17 is included in the frames f15-f17 as a destination MAC address.

In the switch 51, the frames f15-f17 that are transmitted from the ECU 15 are received by the port P3. Further, as shown in FIG. 3, "AD17" and the hop number are registered in the MAC address table 71 of the switch 51 for each of the ring ports P1 and P2.

Therefore, in the switch 51, the communication controller 73 performs an affirmative determination, i.e., "YES", in S220 of FIG. 6. Then, the communication controller 73 of the switch 51 compares the two hop numbers associated with "AD17" in the MAC address table 71 of the switch 51.

In this example, as shown in FIG. 3, the hop number corresponding to "AD17" registered for the ring port P1 is "1", and the hop number corresponding to "AD17" registered for the ring port P2 is "3."

Therefore, the communication controller 73 of the switch 51 selects the ring port P1, with which a smaller one of the two hop numbers, i.e., "1", is associated as a hop number to the destination, as a transfer destination port of the frames f15-f17.

Therefore, the communication controller 73 of the switch 51 transmits the frames f15-f17 that are received by the normal port P3 and are addressed to the ECU 17 from the ring port P1 among the ring ports P1 and P2 of the switch 51 concerned.

On the other hand, the switch 52, by the ring port P1, receives the frames f15-f17 that are transmitted from the ring port P1 of the switch 51.

Then, the communication controller 73 of the switch 52 transmits the frames f15-f17 received by the ring port P1 from the normal port P3 of the switch 52 concerned by filtering. This is because, as shown in FIG. 4, "AD17" is registered for the port P3 in the MAC address table 71 of the switch 52.

Then, the frames f15-f17 transmitted from the normal port P3 of the switch 52 are received by the ECU 17.

Even in case that (i) there are five or more switches connected in a ring shape in the communication network 1, and (ii) one switch So is disposed on a communication route between the ring port P1 of the switch 51 and the ring port P2 of the switch 52, the communication controller 73 of the other switch So transmits the frames f15-f17 that are received by one of the ring ports of the switch So concerned from the other one of the ring ports by filtering. This is because "AD17" is registered in the MAC address table 71 of the switch So for each of the ring ports P1 and P2 just like the other switches 51-54.

<Effects of the Present Embodiment>

According to the switches 51-54, when a frame that has a destination (MAC) address of an ECU connected to the normal port P3 or P4 of one of the other switches is received by the normal port P3 or P4, such a frame is transmitted from one of the ring ports P1, P2, which has a smaller hop number, to the destination ECU. Thus, the frame transmission is performed via the shortest communication route to the destination device.

Further, the communication controller 73 of the switches 51-54 selects one of the ring ports P1 and P2 as a destination of the frame, when the two hop numbers compared in S230 of FIG. 6 are the same. Therefore, one of the two ring ports P1 and P2 is selected without doubt. That is, when the two hop numbers are the same for the ring ports P1 and P2, by selecting a port as a transfer destination based on a frame transmission frequency, i.e., by selecting a less-occupied port, the communication traffic is evenly distributed among the two alternative communication routes.

Further, since the communication controller 73 of the switches 51-54 performs the registration process of FIG. 5, the hop number from the ring port of the subject switch to the ECU connected to the normal ports P3 and P4 of the other switches is calculable for each of the ring ports P1 and P2 of the subject switch, and a registration of the MAC address and the hop number in the MAC address table 71 is automatically performable for each of the ring ports P1 and P2.

Further, the communication controller 73 of the switches 51-54 inserts the VLAN tag area into the received broadcast frame as a hop number counter area, when the broadcast frame is received by the normal port P3 or P4 of the subject switch. Then, the communication controller 73 sets the broadcast frame after inserting the VLAN tag area as the transmission object.

Therefore, the ECUs 15-22 connected to the normal ports P3 and P4 of the switches 51-54 do not have to transmit a broadcast frame with the VLAN tag.

Further, the communication controller 73 of the switches 51-54 removes the VLAN tag area serving as a hop number counter area from the broadcast frame, when transmitting a broadcast frame from the normal ports P3, P4 of the subject switch. Then, the broadcast frame after removing the VLAN tag area is transmitted from the normal ports P3, P4 of the subject switch. Therefore, the broadcast frame without the VLAN tag is transmitted to the ECUs 15-22 connected to the normal ports P3 and P4 of the switches 51-54.

In the present embodiment, the communication controller 73 corresponds to an example of the "communication controller", and, among the processes of FIG. 6, S220 corresponds to an example of the "determination unit", and S230-S260 correspond to an example of the "selection unit", and S270 corresponds to an example of the "transmission unit".

Further, among the processes of FIG. 5, S120-S150 correspond to an example of the "registration controller".

Further, among the processes of S120-S150, S120 corresponds to an example of the "registration determiner", S130 corresponds to an example of the "adder", S140 corresponds to an example of the "registerer", and S150 corresponds to an example of the "setting unit".

Further, among the processes of FIG. 6, S280-S300 correspond to an example of the "area inserter", and, among the processes of FIG. 7, S410 and S420 correspond to an example of the "area remover".

Further, in the present embodiment, even though the communication controller 73 that is an example of the communication controller functions as the registration controller, the area inserter, and the area remover, a different processor other than the controller 73 may be provided for providing the function of those sections, i.e., for providing the registration controller, the area inserter, and the area remover.

<Other Embodiments>

Although an embodiment of the present disclosure is described in the above, the present disclosure may take various forms, without being limited to the above-mentioned embodiment. Further, the numbers of the ECUs, the switches, and the ports in the above is just an example, and may be different in other embodiments.

For example, the MAC address and the hop number in the MAC address table 71 may be set up statically in advance.

When only the ARP request frame is used as a broadcast frame for registering the MAC address and the hop number in the MAC address table 71 for each of the ring ports P1 and P2, for example, the following modification scheme may be applicable.

First, the communication controller 73 in each of the switches 51-54 performs the process of FIG. 5, only when the ARP request frame is received by one of the ring port P1 or P2 of the switch concerned. Then, in S280 of FIG. 6, it is determined whether the normal-port-received frame is the ARP request frame, and when it is determined that the normal-port-received frame is the ARP request frame, the process is configured to proceed to S290.

On the other hand, when the frame that is transmitted and received by the ECUs 15-22 is the frame with the VLAN tag, the communication controller 73 in each of the switches 51-54 does not have to perform S280-S300 of the processes of FIG. 6 and the process of FIG. 7.

Further, the ECU may be connected to the normal ports P3 and P4 in each of the switches 51-54 via the other switches.

Further, the communication protocols may be other protocols other than the Ethernet protocol.

Further, a function of one component in the above embodiments may be distributed to many components, and vice versa.

Further, a part of the above embodiment may be replaced with a well-known configuration in the art, or may be omitted.

Further, any configuration derivable from the language in the present disclosure, especially in claims, is within the scope of the present disclosure.

The switch described above may be replaced with other switch or with other function implementation, such as a program, a media for storing such a program, a relay/repeat method and the like.

Although the present disclosure has been described in connection with preferred embodiment thereof with reference to the accompanying drawings, it is to be noted that various changes and modifications become apparent to those skilled in the art, and such changes, modifications, and summarized schemes are to be understood as being within the scope of the present disclosure as defined by appended claims.

What is claimed is:

1. A repeater in a communication network, the repeater comprising:
   a plurality of repeaters forming a ring shape topology, the ring shape topology realized by a connection of two specific ports among a plurality of ports in each of the plurality of repeaters;
   an address table registering a destination address of a connected device that is connected to each of the plurality of ports in each of the plurality of repeaters for a transfer of a frame in the communication network; and
   a communication controller controlling a transfer of a frame among the plurality of ports, from a receiving port by which the frame is received to a transmitting port from which the frame is transmitted and transmitting the frame from the transmitting port, the transfer of the frame in one repeater performed based on the destination address registered in the address table of the transmitting port that contains the same destination address of the connected device as the destination address in the received frame, wherein
   the plurality of repeaters establish the ring shape topology of the communication network by a connection of the two specific ports among the plurality of ports in one repeater respectively connected to one of the two specific ports in two other different repeaters,
   the address table registers the destination addresses of normal ports in each of the other repeaters in the communication network, the destination addresses of the normal ports representing destination devices connected to the normal ports that are the ports other than the specific ports in the other repeaters,
   the address table for each of the specific ports has a registration of additional information about a hop number representing a number of repeaters for the transmitted frame to pass through to reach from each of the specific ports to the connected device,
   the communication controller includes a determiner determining whether the destination address in the frame that is received by the normal port is registered in the address table of the specific port, and
   the communication controller includes, as a section that operates when a positive determination yields from the determiner:
   a selector (i) comparing two hop numbers registered as the additional information in the address table in association with a destination address in the frame received by the normal port and (ii) selecting, as a transfer destination of the frame received by the normal port, a specific port for which the destination address with a smaller one of the two hop numbers is registered; and
   a transmitter transmitting the frame received by the normal port from the specific port selected by the selector,
   further comprising
   a registration controller registering the hop number in the address table by calculating a hop number,
   wherein
   the communication controller transmits a broadcast frame from other port other than a receiving port, when the broadcast frame is received by the receiving port that includes any one of the plurality of ports, and
   the registration controller includes:
   a registration determiner determining whether a sender address in the received broadcast frame is registered in association with a receiving specific port when the broadcast frame is received by one of the specific ports;
   an adder incrementing a hop number counter in the broadcast frame for counting a number of negative determinations of the registration determiner;
   a registerer registering, in the address table, both of (i) the sender address in the received broadcast frame as an address of the receiving specific port and (ii) an incremented hop number after an increment by the adder as a value of the hop number counter for the sender address; and
   a settor setting, as a transmission object that is to be transmitted by the communication controller, the broadcast frame after the increment of the hop number counter.

2. The repeater of claim 1, wherein
the selector selects one of two specific ports when the two specific ports have the same hop number as the transfer destination of the frame received by the normal port.

3. The repeater of claim 1 further comprising:
an area inserter (A) inserting a hop number counter area into the broadcast frame when the broadcast frame is received by the normal port, and (B) providing the broadcast frame having the hop number counter area as the transmission object that is to be transmitted by the communication controller.

4. The repeater of claim 3 further comprising:
an area remover removing the hop number counter area from the broadcast frame, and controlling the communication controller to transmit the broadcast frame from the normal port after the removal of the area when the broadcast frame is transmitted from the normal port by the communication controller.

* * * * *